Patented Dec. 23, 1952

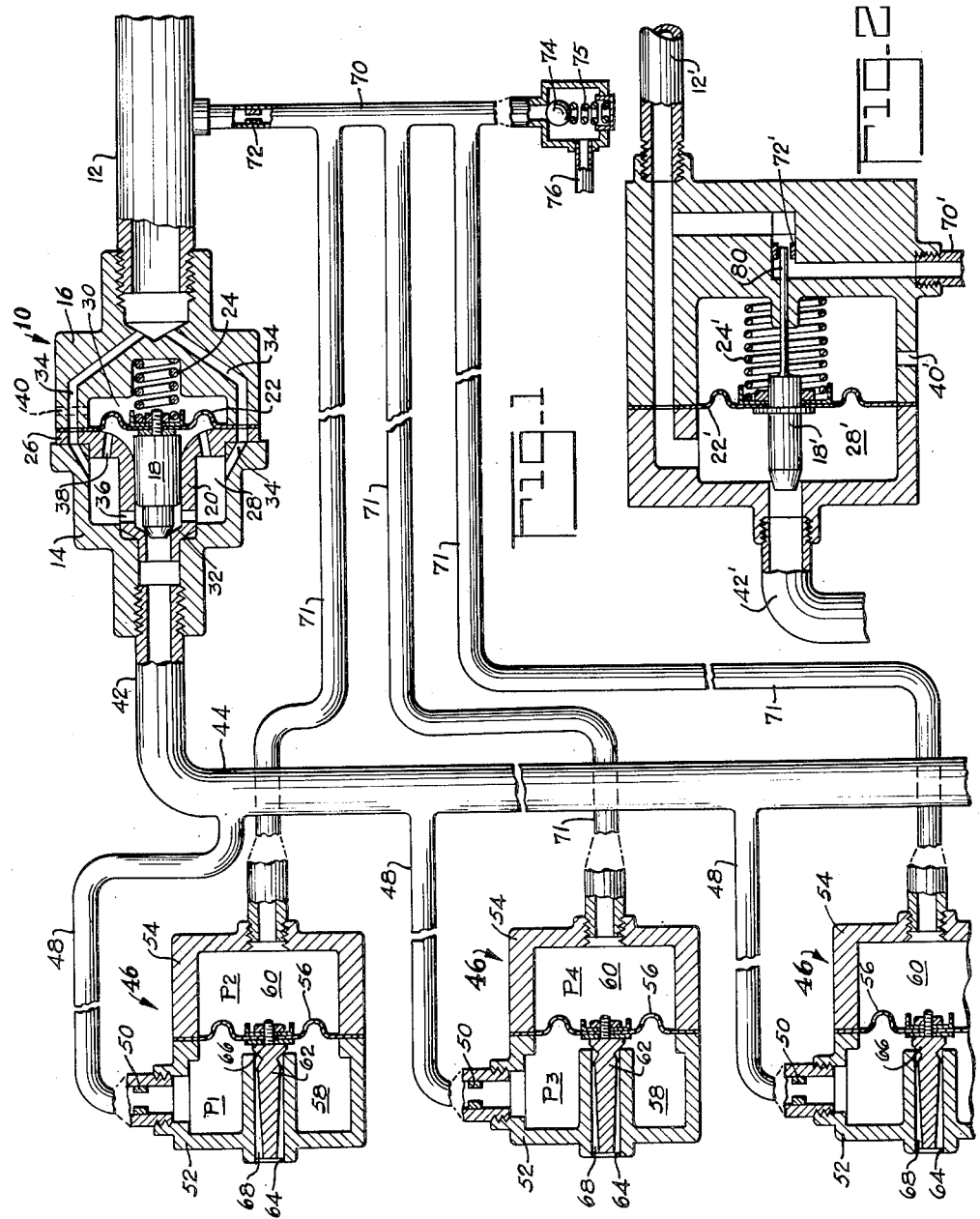

2,622,610

UNITED STATES PATENT OFFICE 2,622,610

FLOW EQUALIZING SYSTEM

Mark R. Rowe, Teaneck, and Francis J. Wiegand, Ridgewood, N. J., assignors to Curtiss-Wright Corporation, a corporation of Delaware Application October 7, 1947, Serial No. 778,310

2 Claims. (Cl. 137—100)

This invention is a continuation-in-part of co-pending application Serial Number 523,770, filed February 23, 1944, now Patent Number 2,430,264, and relates to liquid distributing systems.

The invention relates to a liquid distributing system in which it is desired to maintain a predetermined division of flow between a plurality of passages. Said system constitutes an improvement over that disclosed in said co-pending application in that the predetermined division of flow is more accurately maintained.

An object of this invention comprises the provision of a novel and improved liquid distributing system which automatically maintains an equal or some predetermined division of flow between a plurality of passages not only with changes in the magnitude of the total flow but also with changes in the relative elevation of said passages.

Other objects of the invention will become apparent upon reading the annexed detailed description in connection with the drawing in which:

Figure 1 is a schematic view of a liquid distributing system embodying the invention; and Figure 2 is a view illustrating a modification of a portion of the system of Figure 1.

Referring to Figure 1, liquid under pressure is supplied to a cut-off valve 10 through a conduit 12. The rate at which liquid is supplied to the conduit 12 is controlled by any conventional means (not shown). The cut-off valve 10 comprises housing members 14 and 16, a valve member 18, a valve sleeve 20, a flexible diaphragm 22, and a spring 24. The flexible diaphragm 22 is clamped between the housing members 14 and 16 and a flange 26 on the sleeve 20 thereby forming valve chambers 28 and 30. The valve member 18 is secured to the flexible diaphragm 22 and is slidable thereby within the sleeve 20, the spring 24 urging said valve member against a valve seat 32 formed within said sleeve 20.

Fluid is transmitted from the supply conduit 12 to the valve chamber 28 through passages 34 and thence to the inlet side of the valve member 18 through passages 36 in the valve sleeve 20. The pressure of the liquid in the chamber 28 is transmitted against the diaphragm 22 through openings 38 in the sleeve 20. The chamber 30, on the opposite side of the diaphragm 22, is vented through a passage 40 to the atmosphere or to some other suitable pressure.

With this structure of the valve 10, its valve member 18 is moved to its closed position by the spring 24 whenever the inlet pressure to the valve is less than a predetermined value thereby preventing leakage of liquid when the system is shutdown. When the liquid supply pressure exceeds this predetermined value, the valve 10 opens and liquid flows therethrough into a conduit 42 to a manifold 44. From the manifold 44, liquid flows to a plurality of valves 46 through passages 48. Identical restrictive orifices 50 are disposed in each of the passages 48.

The valves 46 are all the same so that it is only necessary to describe one of said valves. Each valve 46 comprises housing parts 52 and 54 clamped together with a flexible diaphragm 56 therebetween and extending across the housing. Each flexible diaphragm 56 divides its housing into chambers 58 and 60 and a tapered valve member 62 is secured to each diaphragm. Each valve chamber 58 has a discharge passage 64 and its valve member 62 has a seat portion 66 engageable with the inner end of said passage for closing same. In addition each valve member 62 is provided with a plurality of circumferentially spaced and longitudinally extending grooves 68 having a minimum depth at a point adjacent its seat portion 66 and increasing in depth downstream therefrom. In this way, as a valve member 62 moves into its housing the extent to which its valve discharge passage 64 is opened progressively increases.

The valve chambers 60 all communicate with a manifold 70 through passages 71. Liquid is supplied at a reduced pressure to the manifold 70 from the conduit 12 through a restricted orifice 72. The magnitude of the reduced pressure within the manifold 70 is controlled by a pressure relief valve 74 through which liquid discharges from the manifold 70 through a passage 76. The relief valve 74 is urged in a closing direction by a spring 75 of such strength that said valve 74 is designed to open at a pressure per unit area less than that required to open the valve member 18 of the cut-off valve 10. Thus the pressure relief valve 74 is effective to maintain the manifold 70 and the valve chambers 60 full of liquid.

With the aforedescribed arrangement, when liquid is supplied through the conduit 12 at a pressure sufficient to open the valve member 18 of the cut-off valve 10, liquid flows therethrough to each of the valve chambers 58. The pressure in each of these chambers 58 acts against its diaphragm 56 to urge its valve member 62 in a valve opening direction. At the same time the reduced pressure in the manifold 70 is transmitted to each valve chamber 60 where it acts against its diaphragm 58 to urge its valve member 62 in a valve closing direction. Accordingly, each valve member 62 assumes a position at which the rate of liquid flow is such that the pressure drop across its restrictive orifice 50 is sufficient to reduce the pressure in its valve chamber 58 to the magnitude at which the force, exerted by said pressure against its diaphragm 56, balances the opposing force exerted by the pressure in its valve chamber 60. That is, each valve automatically assumes a position maintaining equal opposing fluid pressure forces on its valve operating diaphragm 56. This neglects the fluid pressure forces acting on the valve member 62 itself. Obviously, however, each valve 46 may be designed so that the fluid pressure forces acting on its valve member 62 are negligible compared to the fluid pressure forces acting on its diaphragm 56.

If the orifices 50 are identical and if the liquid pressure drops in the passages 48, other than that produced by restricted orifices 50, are neglected, then each valve 46 will automatically maintain a rate of flow equal to that maintained by the other valves 46. This is true regardless of the rate at which liquid is supplied to the conduit 12 and regardless of the relative elevation of the valves 46. For example, assume that each diaphragm 56 has equal effective areas on its opposite sides and that the pressures in the chambers 58 and 60 of one valve 46 are $P_1$ and $P_2$ respectively and the corresponding pressures in the chambers 58 and 60 of another valve 46 are $P_3$ and $P_4$ respectively, as indicated on the drawing. Also assume that said one valve 46 is disposed at a height above that of the other of said valves such that the pressure $P_4$ is $h$ units greater than the pressure $P_2$. With the valve 10 closed, the pressures $P_2$ and $P_4$ keep their associated valves 46 closed. Then when the valve 10 opens the pressure $P_3$ will also be $h$ units greater than the pressure $P_1$ so that the pressure $P_1$ will momentarily exceed its opposing pressure $P_2$ at the same time that the pressure $P_3$ momentarily exceeds its opposing pressure $P_4$. Accordingly the valves 46 will all open at the same time and, when open, their valve members 62 will automatically assume positions such that the pressures in their respective chambers 58 and 60 are equal. That is, $P_1$ is automatically maintained equal to $P_2$ and $P_3$ is automatically maintained equal to $P_4$. Then, since the pressures $P_1$, $P_2$, $P_3$, and $P_4$ are all derived from the same source, and neglecting any pressure drops in the passages 48 except that across their restrictive orifices 50, the pressure drops across said orifices, must all be equal. Obviously, this is true regardless of the magnitude of the total flow and regardless of changes in the relative elevation of the valves 46. Therefore, since the orifices 50 are all identical, the magnitude of the flow through each valve 46 is the same as the magnitude of the flow through the other valves 46. Thus, each valve member 62 automatically assumes a position such that the total flow is equally divided between the valves 46.

In an installation in which the relative elevation of the valves 46 changes, as in a fuel distributing system for an aircraft engine, the opposite sides of the valve diaphragms 56 should be of substantially equal effective area if the system is to maintain a predetermined division of flow regardless of changes in said relative elevation. This has been assumed to be the case in the above analysis. As illustrated in Figure 1 the effective area of each diaphragm 56 is slightly larger on the side of its chamber 60. However, in such a fuel system installation, the changes in the pressures in the chambers 58 and 60, resulting from changes in the relative elevation of the valves 46, is small compared to the pressures in said chambers. Accordingly the diameter of the valve stem 62, as illustrated is or said diameter can be made sufficiently small so that the difference between the effective area exposed to the fluid pressure in the chamber 58, urging the valve member 62 toward its open position, and the effective area exposed to the fluid pressure in the chamber 60, urging the valve member 62 toward its closed position, is sufficiently small so that said difference is negligible as far as maintenance of a predetermined division of flow is concerned.

The above analysis also neglects the pressure drops in the passages 48 except that across their restrictive orifices 50. If said neglected pressure drops are substantially equal or if the difference between said pressure drops is small compared to the pressure drop across their respective orifices 50, then the valves 56 will automatically divide the flow as above described. However, when one passage 48 has a flow resistance which is sufficiently larger than that of the other passages 48 so that the difference between said resistances is not negligible compared to the resistance offered by the respective orifices 50, then the flow through said one passage 48 will be somewhat less than the flow through the other passages. If this discrepancy is considered to be objectionable, then instead of locating the valves 46 at the points of discharge of the liquid from the passages 48, the restrictive orifices 50 and their associated valves 46 may all be located close to or at the same distance from the manifold 44, with passages extending from said valves to the desired points of discharge of the liquid. Alternatively, the valves 46 may be disposed at the points of discharge of the liquid with their respective restrictive orifices 50 disposed adjacent to or at equal distances from the manifold 44 and with one side of their diaphragm 56 subjected to the pressure immediately downstream of their respective restricted orifices for urging the valves in an opening direction.

Obviously the smaller the orifices 50, the more sensitive and the more accurate is the system in maintaining an equal division of flow between the valves 46. However the orifices 50 must be large enough so that the maximum rates of flow, for which the system is designed, can be transmitted through said orifices without requiring excessive pressures in the supply conduit 12.

Also, instead of providing for an equal division of flow between the valves 46 any predetermined division of flow may be maintained by using restricted orifices 50 of different sizes in the passages 48.

The flow through the manifold 70 need not be large and may amount to less than 1% of the total flow. Thus the restricted orifice 72 can be made quite small and the pressure relief valve 74 is designed to maintain a predetermined pressure in the manifold 72 so as to keep said manifold and the valve chambers 60 full of liquid at a pressure less than the pressure in the supply conduit 12. The liquid flow through the manifold 72 and the passage 76 may be returned to the source of supply of the liquid or any desired use may be made of the liquid flowing through said manifold.

With the manifold 70 full of liquid, the pressure in each valve chamber 60 will always be greater than the pressure of the atmosphere into which said manifold discharges through its outlet passage 76. Similiarly, upon a flow of liquid through the valves 46, the pressure in each valve chamber 58 will always be larger than the pressure of the atmosphere into which its valve 46 discharges, even in the full open position of its valve member 62. Accordingly, since the effective areas of the opposite sides of each diaphragm 56 are substantially equal, the restrictive orifice 72 and relief valve 74 should be designed so that the pressure in each valve chamber 60 is larger than the atmosphere into which its valve 46 discharges. Obviously if the pressure in a valve chamber 60 drops sufficiently, the force exerted on its valve operating diaphragm 56, by the pressure in the valve chamber 58, may move the valve member 62 to its fully opened position, whereupon said valve member will be unable to maintain equal forces on opposite sides of its diaphragm 56. This condition may be avoided by discharging the liquid flowing through the manifold 70 and its outlet passage 76 into the same atmosphere as that into which the valves 46 discharge.

Preferably the flow through the manifold 70 is small since the only function of the liquid in said manifold is to maintain a reduced liquid pressure in the valve chambers 60. Accordingly the orifice 72 is made as small as possible without danger of said orifice becoming clogged. Obviously if the orifice 72 should clog, the valve chambers 60 no longer would contain liquid under pressure whereupon the valves 46 would all fully open in response to the pressures in their chambers 58 and thereupon said valves would no longer operate to maintain the desired division of flow. Figure 2 schematically illustrates a construction whereby means are provided for automatically cleaning said orifice thereby making it possible to reduce the size of said orifice without danger of said orifice becoming clogged. The parts of Figure 2, corresponding to those of Figure 1, have been indicated by similar but primed reference numerals.

In Figure 2, liquid supplied through a conduit 12' flows into a valve chamber 28' and acts against one side of a flexible diaphragm 22' to urge a valve member 18' in an opening direction against a spring 24'. The opposite side of the diaphragm is vented through a passage 40'. The valve member 18' opens when the pressure of the liquid supplied thereto exceeds a predetermined value whereupon said liquid flows into the passage 42'. The supply conduit 12' also communicates with a manifold 70' through a restrictive orifice 72'. An extension 80 on the valve member 18' is co-axial with the orifice 72' and extends therethrough. With this arrangement movements of the valve member 18' cause the extension 80 to move within the orifice 72' thereby preventing clogging of said orifice.

While we have described our invention in detail in its present preferred embodiment, it will be obvious to those skilled in the art, after understanding our invention, that various changes and modifications may be made therein without departing from the spirit or scope thereof. We aim in the appended claims to cover all modifications.

We claim as our invention:

1. A liquid distributing system comprising a plurality of valve housings each having a movable member dividing said housing into first and second chambers, each of said valve housings also having a discharge opening communicating with its associated first chamber; a valve connected to each movable member for controlling the associated discharge opening; a cut-off valve arranged to open when the pressure of the liquid supplied thereto exceeds a predetermined value; passages for supplying liquid from said cut-off valve to said first chambers; a restricted orifice in each of said passages; a liquid manifold; a passage providing communication between said manifold and the upstream side of said cut-off valve; a restrictive orifice in said last-mentioned passage; a pressure relief valve downstream of said manifold for controlling the flow of liquid therethrough; said pressure relief valve being arranged to open at a pressure less than the pressure at which said cut-off valve opens; and passages providing communication from said manifold to said second chambers; each of said movable members being urged in a direction for opening its valve by the pressure in its first chamber and being urged in the opposite direction by the pressure in its second chamber.

2. A liquid distributing system comprising a plurality of valve housings each having a movable member dividing said housing into first and second chambers, each of said housings also having a discharge opening communicating with its associated first chamber; a valve connected to each said movable member for controlling the associated discharge opening; a cut-off valve arranged to open when the pressure of the liquid supplied thereto exceeds a predetermined value; passages for supplying liquid from said cut-off valve to said first chambers for flow through said discharge openings; an identical restrictive orifice in each of said passages; a liquid manifold; a passage providing communication between said manifold and the upstream side of said cut-off valve; a restrictive orifice in said last-mentioned passage; means movable with said cut-off valve and extending co-axially into said last-mentioned restrictive orifice; a pressure relief valve downstream of said manifold for controlling the flow of liquid therethrough; and passages providing communication from said manifold to said second chambers, each of said movable members being urged in a direction for opening its valve by the pressure in its first chamber and being urged in the opposite direction by the pressure in its second chamber.

MARK R. ROWE.
FRANCIS J. WIEGAND.

REFERENCES CITED

The following references are of record in the file of this patent:

UNITED STATES PATENTS

| Number | Name | Date |
|---|---|---|
| 1,272,212 | Callan | July 9, 1918 |
| 1,930,455 | Hannum | Oct. 10, 1933 |
| 2,064,864 | Temple | Dec. 22, 1936 |
| 2,283,266 | Kinsella | May 19, 1942 |
| 2,291,229 | Johnson | July 28, 1942 |
| 2,313,797 | Bailey | Mar. 16, 1943 |
| 2,430,264 | Wiegand et al. | Nov. 4, 1947 |

FOREIGN PATENTS

| Number | Country | Date |
|---|---|---|
| 577,132 | Great Britain | May 7, 1946 |